US010685216B2

(12) United States Patent
Wang

(10) Patent No.: US 10,685,216 B2
(45) Date of Patent: Jun. 16, 2020

(54) METHOD FOR COLLECTING FACIAL INFORMATION AND RELATED DEVICES

(71) Applicant: GUANGDONG OPPO MOBILE TELECOMMUNICATIONS CORP., LTD., Dongguan, Guangdong (CN)

(72) Inventor: Junlong Wang, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 83 days.

(21) Appl. No.: 16/106,468

(22) Filed: Aug. 21, 2018

(65) Prior Publication Data

US 2019/0080151 A1 Mar. 14, 2019

(30) Foreign Application Priority Data

Sep. 12, 2017 (CN) ......................... 2017 1 0820578

(51) Int. Cl.
*G06K 9/00* (2006.01)
*G06K 9/22* (2006.01)
(Continued)

(52) U.S. Cl.
CPC ......... *G06K 9/00268* (2013.01); *G06F 21/32* (2013.01); *G06K 9/00255* (2013.01); *G06K 9/00275* (2013.01); *G06K 9/22* (2013.01); *G06K 9/4652* (2013.01); *G06K 9/4661* (2013.01); *G06K 9/6202* (2013.01); *H04N 5/2256* (2013.01)

(58) Field of Classification Search
None
See application file for complete search history.

(56) References Cited

U.S. PATENT DOCUMENTS

2005/0248660 A1* 11/2005 Stavely .............. H04N 5/23258 348/208.16
2007/0247416 A1* 10/2007 Chang .................. G09G 3/3406 345/102
(Continued)

FOREIGN PATENT DOCUMENTS

CN 101449288 6/2009
CN 102970411 3/2013
(Continued)

OTHER PUBLICATIONS

EPO, Office Action for EP Application No. 18193660, dated Nov. 23, 2018.

(Continued)

*Primary Examiner* — Andrae S Allison
(74) *Attorney, Agent, or Firm* — Hodgson Russ LLP

(57) ABSTRACT

Embodiments of the present disclosure disclose a method for collecting facial information and related devices. The method includes: displaying a background image on the touch display screen, in which a brightness of the background image is greater than or equal to a first brightness, and light emitted from the touch display screen and the background image is configured to illuminate a face of a user; and collecting, by the facial information collection apparatus, the facial information of the user whose face is illuminated by the light emitted from the touch display screen and the background image.

19 Claims, 5 Drawing Sheets

101 displaying a background image on a touch display screen, in which a brightness of the background image is greater than or equal to a first brightness, and light emitted from the touch display screen and the background image is configured to illuminate a face of a user

102 collecting the facial information of the user with the face illuminated by the light emitted from the touch display screen and the background image by the facial information collection apparatus

(51) Int. Cl.

| | |
|---|---|
| ***G06F 21/32*** | (2013.01) |
| ***G06K 9/46*** | (2006.01) |
| ***G06K 9/62*** | (2006.01) |
| ***H04N 5/225*** | (2006.01) |

(56) References Cited

U.S. PATENT DOCUMENTS

| | | | | |
|---|---|---|---|---|
| 2009/0216007 | A1* | 8/2009 | Zhang | C08B 37/006 536/128 |
| 2010/0225780 | A1* | 9/2010 | Shimizu | H04N 5/23219 348/223.1 |
| 2010/0265342 | A1* | 10/2010 | Liang | H04N 5/2353 348/208.4 |
| 2012/0262599 | A1* | 10/2012 | Brunner | H04N 5/23216 348/222.1 |
| 2013/0015946 | A1* | 1/2013 | Lau | G07C 9/00 340/5.2 |
| 2014/0313307 | A1 | 10/2014 | Oh et al. | |
| 2015/0015688 | A1* | 1/2015 | Yang | G06F 21/32 348/77 |
| 2015/0016692 | A1* | 1/2015 | Hanna | G06K 9/00604 382/117 |
| 2015/0310259 | A1* | 10/2015 | Lau | G06K 9/00288 382/118 |

FOREIGN PATENT DOCUMENTS

| | | | | |
|---|---|---|---|---|
| CN | 103135743 | | 6/2013 | |
| CN | 104424467 | | 3/2015 | |
| CN | 105389491 | | 3/2016 | |
| CN | 106899803 | | 6/2017 | |
| CN | 106973225 | | 7/2017 | |
| CN | 107657221 | | 2/2018 | |
| EP | 2023284 | | 2/2009 | |
| EP | 2023284 | A1 * | 2/2009 | G06K 9/2027 |
| EP | 2993619 | | 3/2016 | |

OTHER PUBLICATIONS

WIPO, English translation of the ISR and WO for PCT/CN2018/105262, dated Dec. 5, 2018.

SIPO, First Office Action for CN Application No. 201710820578.5, dated Feb. 3, 2020.

* cited by examiner

METHOD FOR COLLECTING FACIAL INFORMATION AND RELATED DEVICES

CROSS-REFERENCE TO RELATED APPLICATION

The present application is based upon and claims priority to Chinese Patent Application No. 201710820578.5, filed on Sep. 12, 2017, the entire contents of which are incorporated herein by reference.

TECHNICAL FIELD

The present disclosure relates to an electronic technology field, and more particularly relates to a method for collecting facial information and related devices.

BACKGROUND

Nowadays, with the rapid development of science and technology, facial information collection technology has been widely used in the face unlocking of smart phones. Facial information collection technology is a technology for collecting facial information based on the unique feature of human's face. At present, the process for collecting the facial information generally includes: activating a facial information collection apparatus, aligning a face of a user to the facial information collection apparatus, and collecting the facial information of the user by the facial information collection apparatus.

SUMMARY

Embodiments of the present disclosure provide a method for collecting facial information and related devices.

Embodiments of the present disclosure provide a method for collecting facial information, which is applicable to a terminal device including a facial information collection apparatus and a touch display screen. The method may include: displaying a background image on the touch display screen, in which a brightness of the background image is greater than or equal to a first brightness, and light emitted from the touch display screen and the background image is configured to illuminate a face of a user; and collecting, by the facial information collection apparatus, the facial information of the user whose face is illuminated by the light emitted from the touch display screen and the background image.

Embodiments of the present disclosure provide a terminal device, including a front camera, a touch display screen and a processor. The processor is configured to control a background image to be displayed the touch display screen, in which a brightness of the background image is greater than or equal to a first brightness, and light emitted from the touch display screen and the background image is configured to illuminate a face of a user. The front camera is configured to collect the facial information of the user whose face is illuminated by the light emitted from the touch display screen and the background image.

Embodiments of the present disclosure provide a non-transitory computer readable storage medium for storing computer programs for exchanging digital data, in which the non-transitory computer programs are executed to cause a computer performing the method according to the first aspect.

These and other aspects of the present disclosure will be apparent and easy to be understood in the descriptions of following embodiments.

BRIEF DESCRIPTION OF THE DRAWINGS

In order to make the technical solutions of embodiments of the present disclosure or prior art more clearly, the accompanying drawings used in the description of embodiments of the present disclosure are briefly described hereafter. Obviously, the described drawings are merely some embodiments of present disclosure. For persons skilled in the art, other drawings may be obtained based on these drawings without any creative work.

DETAILED DESCRIPTION

Figure 1:
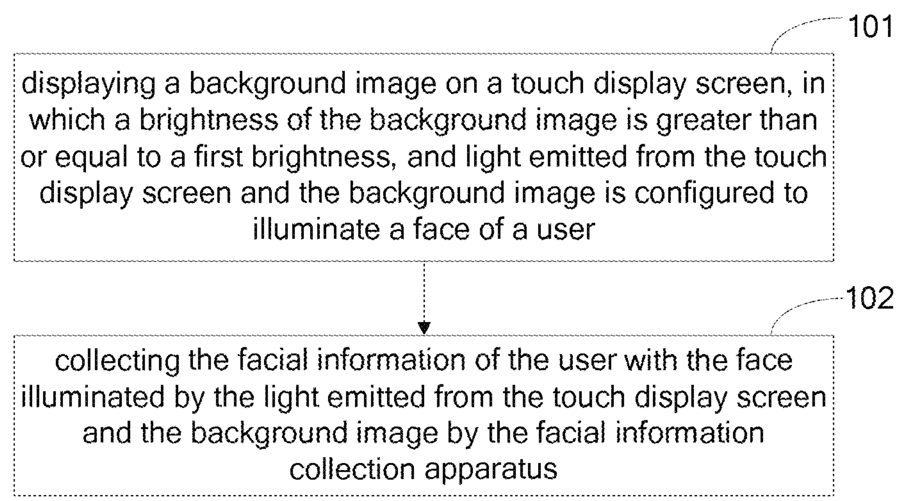
FIG. 1 is a schematic flow chart of a method for collecting facial information provided by an embodiment of the present disclosure.

For a better understanding of the present disclosure for the skilled in the art, the technical solutions in embodiments of the present invention are hereinafter described clearly and completely with reference to accompanying drawings in embodiments of the present disclosure. Apparently, embodiments described are a part of embodiments of the present disclosure, but not all embodiments. All other embodiments obtained by those skilled in the art based on the embodiments in the present disclosure without creative labor shall fall in the protection scope of the present invention.

The detail description will be made in followings.

Terms such as "first", "second", "third", "fourth" and the like used in the specification, in claims and in drawings are configured herein for distinguishing different subjects, but not for showing a particular sequence. Furthermore, the terms such as "include", "comprise" and any other variations thereof are intended to be non-exclusive. For example, a process, a method, a system, a product or a device including or comprising a sequence of blocks or units is not limited to include or comprise the listed blocks or unit, instead, they alternatively further include or comprise other blocks and units that are not listed or alternatively further include inherent blocks or units of the process, the method, the system, the product or the device.

Term such as "embodiments" referred herein means that, particular features, structures and characteristics described in combination with embodiments may be covered in at least one embodiment of the present disclosure. Usages of the term for many times in the specification are not necessary to refer to a same embodiment or same embodiments, and they are not independent embodiments mutually exclusive with other embodiments or unimportant embodiments. It may be explicitly or implicitly understood by those skilled in the art that, embodiments described herein can be combined with other embodiments.

Some terms used in the present disclosure will be described and explained as follow so as to be understood by the skilled in the art.

(1) A terminal device, also known as a user equipment (UE), is a device that provides voice and/or data connectivity to users, such as a handheld device with a wireless connection function, an in-vehicle device, and the like. Common terminals include, for example, mobile phones, tablets, notebook computers, PDAs, mobile internet devices (MIDs), wearable devices such as smart watches, smart bracelets, pedometers, and the like.

(2) The dark visual environment refers to dark or low light environment where the user stays. In the dark visual environment, the user sees everything that is grayish black or nearly grayish black, with no color sense or low color sense.

At present, in the dark visual environment, the face of the user collected by the facial information collection apparatus is usually unclear, and the success rate of the face unlocking may be affected when the collected face is used for the face unlocking. In the present disclosure, when collecting the user's face in the dark visual environment, the touch display screen and the background image may be used as auxiliary light sources to improve the quality of the collected face information of the user, thereby improving the success rate of the face unlocking.

Referring to FIG. 1, FIG. 1 is a schematic flow chart of a method for collecting facial information provided by an embodiment of the present disclosure, which is applicable to a dark visual environment. The method may include followings.

At block 101, a background image is displayed on a touch display screen, in which a brightness of the background image is greater than or equal to a first brightness, and light emitted from the touch display screen and the background image is configured to illuminate a face of a user.

The first brightness is a minimum value of the brightness of the background image when a terminal device uses the background image as an auxiliary light source to illuminate the user's face in the dark visual environment.

The background image displayed on the touch display screen is an image from a background image gallery stored in the terminal device. The background image gallery includes plurality of background images, which may be wallpapers, images of a single color (such as green, red, white, blue, etc.), images taken by the user, images downloaded by the user when browsing news information, etc. The wallpapers may include still wallpapers or live wallpapers. The brightness of the plurality of background images may be the same or different, which is not limited herein. The colors of the plurality of background images may be the same or different, which is not limited herein.

Further, the background images in the background image gallery may be updated once for a certain time such as 1 day, 1 week, 2 weeks, 1 month, etc. The plurality of background images included in the updated background image gallery are different from the plurality of background images included in the background image gallery before updating. Alternatively, there may be at least one background image in the updated background image gallery which is different from the plurality of background images in the background image gallery before updating.

Further, the background image gallery may be updated in following manners. The terminal device acquires a behavior record of the user in a period of time. The terminal device determines K topics that the user interested in according to the behavior record. The terminal device acquires W images including one of the K topics from the images stored in the terminal device, in which the brightness of the W images is greater than or equal to the first brightness. The terminal device replaces W background images in the background image gallery with the W images, where K and W are positive integers.

In an embodiment, the background image gallery may be updated in following manners. The terminal device acquires M images newly added in the terminal device in the latest period of time. The terminal device obtains J images whose brightness is greater than or equal to the first brightness from the M images. The terminal device replaces J background images in the background image gallery with the J images, where J is less than or equal to M, and M is an integer greater than 1.

In an example, when the terminal device detects that an event to be processed requires a face unlocking, the act in block 101 is performed.

The event to be processed may include: a payment event, a screen unlocking event, an encrypted video chat event, an application login event and the like. When the event to be processed is the screen unlocking event and the terminal device is in a black screen state before performing the act in block 101, the terminal device needs to illuminate the touch display screen of the terminal device before performing the act in block 101.

When collecting the facial information, the brightness of the background image corresponding to different events to be processed may be the same or different, which is not limited herein.

At block 102, the facial information of the user whose face is illuminated by the light emitted from the touch display screen and the background image is collected by the facial information collection apparatus.

In an example, after performing the act in block 102, the method may further include followings.

The terminal device matches the collected facial information of the user with a face template.

When the facial information of the user is matched to the face template, the terminal device performs the event to be processed.

Figure 2:
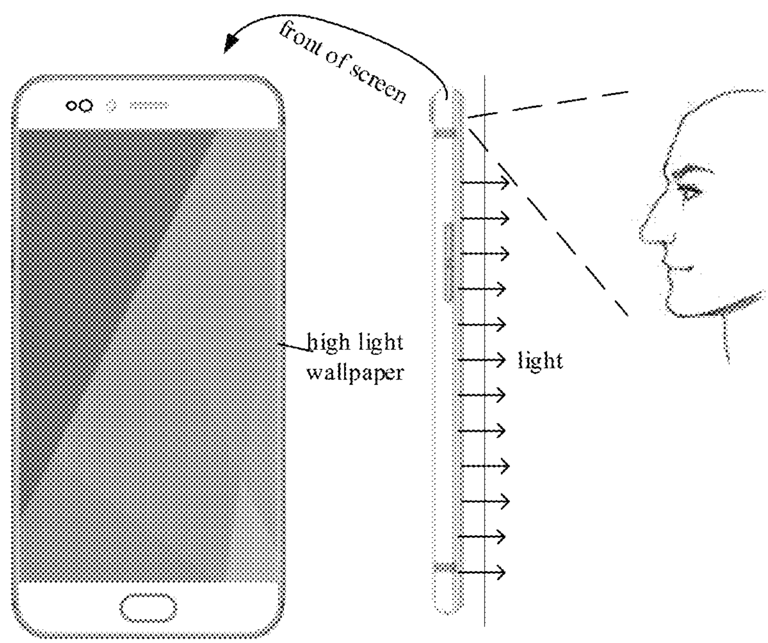
FIG. 2 is schematic interface diagram provided by an embodiment of the present disclosure.

For example, as shown in FIG. 2, FIG. 2 is schematic interface diagram provided by an embodiment of the present disclosure. Assume that the event to be processed is the screen unlocking event, the facial information collection apparatus is a front camera, the background image is a high light wallpaper. When the screen unlocking event is detected by the terminal device in a dark visual environment and the terminal device is in the black screen state, the terminal device illuminates the touch display screen firstly, and then displaying a high light wallpaper with a brightness greater than or equal to the first brightness on the touch display screen. The touch display screen and the high light wallpaper are regarded as auxiliary light sources illuminating the user's face. After that, the terminal device activates the front camera to collect the facial information of the user. Finally, the collected facial information of the user is matched with the face template, and when the matching is succeeded (i.e., when the collected facial information of the user is matched to the face template), the terminal device is unlocked and enters the main interface.

For another example, assume that the event to be processed is the application login event, and the facial information collection apparatus is a front camera. When the screen unlocking event is detected by the terminal device in the dark visual environment, as the terminal device is in a bright screen state with respect to the application login event, the terminal device does not need to illuminate the touch display screen and may directly display the background image having a brightness greater than or equal to the first brightness on the touch display screen, the touch display screen and the background image are regarded as auxiliary light sources to illuminate the user's face. After that, the terminal device activates the front camera to collect the facial information of the user. Finally, the collected facial information of the user is matched with the face template, and when the matching is succeeded (i.e., the collected facial information of the user is matched to the face template), the terminal device is unlocked and enters the application main interface.

Thus, in the present disclosure, when collecting the user's face in the dark visual environment, the touch display screen and the background image are used as auxiliary light sources to improve the quality of the collected facial information of the user, thereby improving the success rate of the face unlocking.

In an example, before the terminal device displays the background image on the touch display screen, the method may also include: detecting a brightness of present ambient light. A specific implementing manner of displaying the background image on the touch display screen may include: displaying the background image at a brightness corresponding to the brightness of the present ambient light on the touch display screen according to a mapping relation between the brightness of the present ambient light and the brightness of the background image.

The ambient light is the light in the real environment where the user and the terminal device are located. The ambient light may be natural light or artificial light, which is not limited herein.

The specific manner of detecting the brightness of the present ambient light by the terminal device may include followings. In a preset range, the terminal device acquires the brightness of the present ambient light by an ambient light sensor of the terminal device, in which the preset range is a spatial range in a real environment where the user and the terminal device are located. The spatial range is a range of a circle having a radius of R, in which R may be, for example, 1 m, 2 m, 3 m, 4 m, 5 m or other values.

The mapping relation between the brightness of the ambient light and the brightness of the background image is illustrated in Table 1. The brightness of the ambient light is smaller than the brightness of the corresponding background image.

TABLE 1

| brightness of ambient light (lux) | brightness of background image (lux) |
| --- | --- |
| 0-20 | 20-40 |
| 21-40 | 41-60 |
| 41-60 | 61-80 |
| 61-80 | 81-100 |
| 81-100 | 101-120 |
| . | . |
| . | . |
| . | . |

When there are a plurality of background images corresponding to the brightness of the present ambient light, displaying the background image at a brightness corresponding to the brightness of the present ambient light on the touch display screen may include: selecting a background image from the plurality of background images by the terminal device; and displaying the selected background image on the touch display screen by the terminal device.

The manner of selecting a background image from the plurality of background images may include at least one of the followings.

(1) The terminal device selects any one background image from the plurality of background images.

(2) The terminal device selects a background image from the plurality of background images according to a preset rule, in which the preset rule is to select in a sequence of green, red, blue, white, yellow, purple.

(3) The terminal device selects a background image with the highest brightness from the plurality of background images.

(4) The terminal device acquires a browsing history record of the user in the preset time period, determining preference of the user according to the browsing history record and selecting a background image associated with the preference from the plurality of background images, and the preset time period may be, for example, 1 day, 3 days, 5 days, 1 week, etc.

For example, assume that R of the preset range is 3 m, there are 100 static wallpapers stored in the terminal device, and the background image is selected from the plurality of background images in a sequence of green, red, blue, white, yellow, purple. In a spatial range of a circle with a radius of 3 m, the terminal device detects that the brightness of the present ambient light is 25 lux by the ambient light sensor, and the terminal device may know the brightness of the corresponding background image is within a range from 41 lux to 60 lux according to Table 1. Assume that there are four of 100 static wallpapers stored in the terminal device of which the brightness is in the range from 41 lux to 60 lux, the four wallpapers are: a red wallpaper with a brightness of 50 lux, a yellow wallpaper with a brightness of 42 lux, a green wallpaper with a brightness of 45 lux and a purple wallpaper with a brightness of 53 lux. The terminal device selects the green static wallpaper with a brightness of 45 lux according to the preset rule of selecting in a sequence of green, red, blue, white, yellow, and purple, and displays the green static wallpaper with the brightness of 45 lux corresponding to the brightness of 25 lux of the present ambient light on the touch display screen.

In an embodiment, the method may also include followings.

When the terminal device displays the background image, a brightness of the touch display screen is adjusted to a brightness corresponding to the brightness of the present ambient light according to a mapping relation between the brightness of the present ambient light and the brightness of the touch display screen.

In an embodiment, the method may also include followings.

When the terminal device displays the background image, the brightness of the touch display screen is adjusted to a fixed brightness.

The mapping relation between the brightness of the ambient light and the brightness of the touch display screen is illustrated in Table 2. The brightness of the ambient light is smaller than the brightness of the corresponding touch display screen.

TABLE 2

| brightness of ambient light (lux) | brightness of touch display screen (lux) |
|---|---|
| 0-20 | 5-25 |
| 21-40 | 26-45 |
| 41-60 | 46-65 |
| 61-80 | 66-85 |
| 81-100 | 86-105 |
| . | . |
| . | . |
| . | . |

For example, assume that R of the preset range is 3 m. In the spatial range of the circle with a radius of 3 m, the terminal device detects that the brightness of the present ambient light is 15 lux by the ambient light sensor, and the terminal device may know that the brightness of the corresponding touch display screen is within a range from 5 lux to 25 lux according to Table 2. The terminal device adjusts the brightness of the touch display screen to any brightness within the range from 15 lux to 25 lux of the touch screen display.

For another example, assume that R of the preset range is 3 m, in the spatial range of the circle having a radius of 3 m, the terminal device detects that the brightness of the present ambient light is 15 lux by the ambient light sensor, and the terminal device adjusts the brightness of the touch display screen to a fixed brightness, which may be, for example, 10 lux, 15 lux, 20 lux, 25 lux or other values.

In an example, when a sum of the brightness of the background image and the brightness of the present ambient light is greater than or equal to a second brightness, backlight brightness of the touch display screen is smaller than the brightness of the background image.

The second brightness is a minimum value of the sum of the brightness of the background image and the brightness of the present ambient light as an auxiliary light source to illuminate the face of the user when the terminal device collects the facial information in a dark visual environment. The second brightness enables that the face unlocking can be performed successfully by using the face image of the user collected by the facial information collection apparatus.

The specific manner of setting the backlight brightness of the touch display screen being smaller than the brightness of the background image by the terminal device may include followings. The terminal device turns down the brightness of the touch display screen. Alternatively, the terminal device adjusts the brightness of the touch display screen to a minimum value.

For example, assume that R of the preset range is 3 m and the second brightness is 50 lux. In the spatial range of a circle with a radius of 3 m, the terminal device detects that the brightness of the present ambient light is 25 lux by the ambient light sensor. The terminal device may know, according to Table 1, that the brightness of the corresponding background image is in a range from 41 lux to 60 lux, and the brightness of the ambient light is smaller than the brightness of the corresponding background image. Therefore, the sum of the brightness of the background image and the brightness of the present ambient light is greater than 50 lux. The terminal device may know that the brightness of the corresponding touch display screen is within a range from 26 lux to 45 lux according to Table 2. The terminal device may adjust the brightness of the touch display screen to 26 lux or less, or the terminal device may adjust the brightness of the touch display screen to the lowest 5 lux.

Thus, when the sum of the brightness of the background image and the brightness of the current ambient light is greater than or equal to the second brightness, by limiting the backlight brightness of the touch display screen to be smaller than the brightness of the background image, the power consumption of the terminal device may be reduced, thereby improving the endurance of the terminal device.

In an example, the method may also include followings. When displaying the background image, a face photographing prompt is displayed on a displaying interface of the touch display screen to remind the user a time difference between a time of displaying the background image and a time of collecting the face of the user, in which the time difference is smaller than or equal to a preset threshold.

For example, the preset threshold may be 1 s, 1.5 s, 2 s, 2.5 s, 3 s or other values.

Further, the specific manner of displaying the face photographing prompt on the displaying interface of the touch display screen by the terminal device may include followings. The terminal device pops out a face photographing prompt box on the display interface of the touch display screen in the upper left corner, the upper right corner, the lower left corner, the lower right corner or the middle area, and a text prompt, a digital prompt, an animation prompt, a voice prompt and the like may be displayed in the face photographing prompt box. The text prompt may be, for example, "face will be photographed within 2 s, please be prepared", etc. The animation prompt may be, for example, a static picture or a dynamic picture indicating that face will be photographed within 2 s, please be prepared, etc. The voice prompt may be, for example, "face will be photographed within 2 s, please be prepared", etc.

Figure 3:
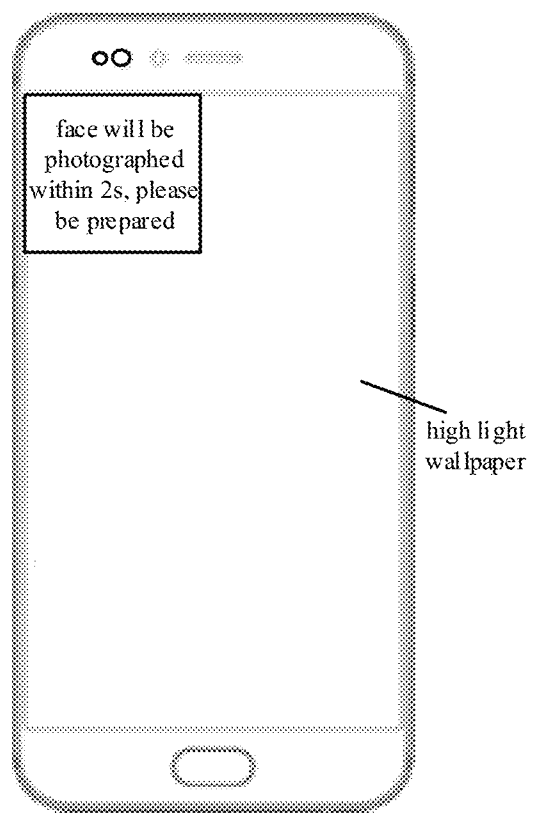
FIG. 3 is schematic interface diagram provided by another embodiment of the present disclosure.

For example, referring to FIG. 3, FIG. 3 is schematic interface diagram provided by another embodiment of the present disclosure. Assume that R of the preset range is 3 m, and the preset threshold is 3 s. A face photographing prompt box pops out in the upper left corner of the display interface of the touch display screen, and the face photographing prompt uses the text message prompt "face will be photographed within 2 s, please be prepared". In the spatial range of the circle with a radius of 3 m, when the background image is displayed on the display interface of the touch display screen of the terminal device, the terminal device pops out the face photographing prompt box in the upper left corner of the display interface of the touch display screen. The text of "face will be photographed within 2 s, please be prepared" may be displayed in the face photographing prompt box. When a time difference between the present time and the time for collecting the face of the user is smaller than or equal to 3 s, the terminal device collects the user's face by the front camera.

Thus, when the terminal device displays the background image, by displaying the face photographing prompt on the displaying interface of the touch display screen within a time period, in which any time within the time period has a time difference from the time for collecting the user's face smaller than or equal to the preset threshold, the quality of the collected facial information of the user may be improved and the power consumption of the terminal device may be reduced, thereby improving the endurance of the terminal device.

Figure 4:
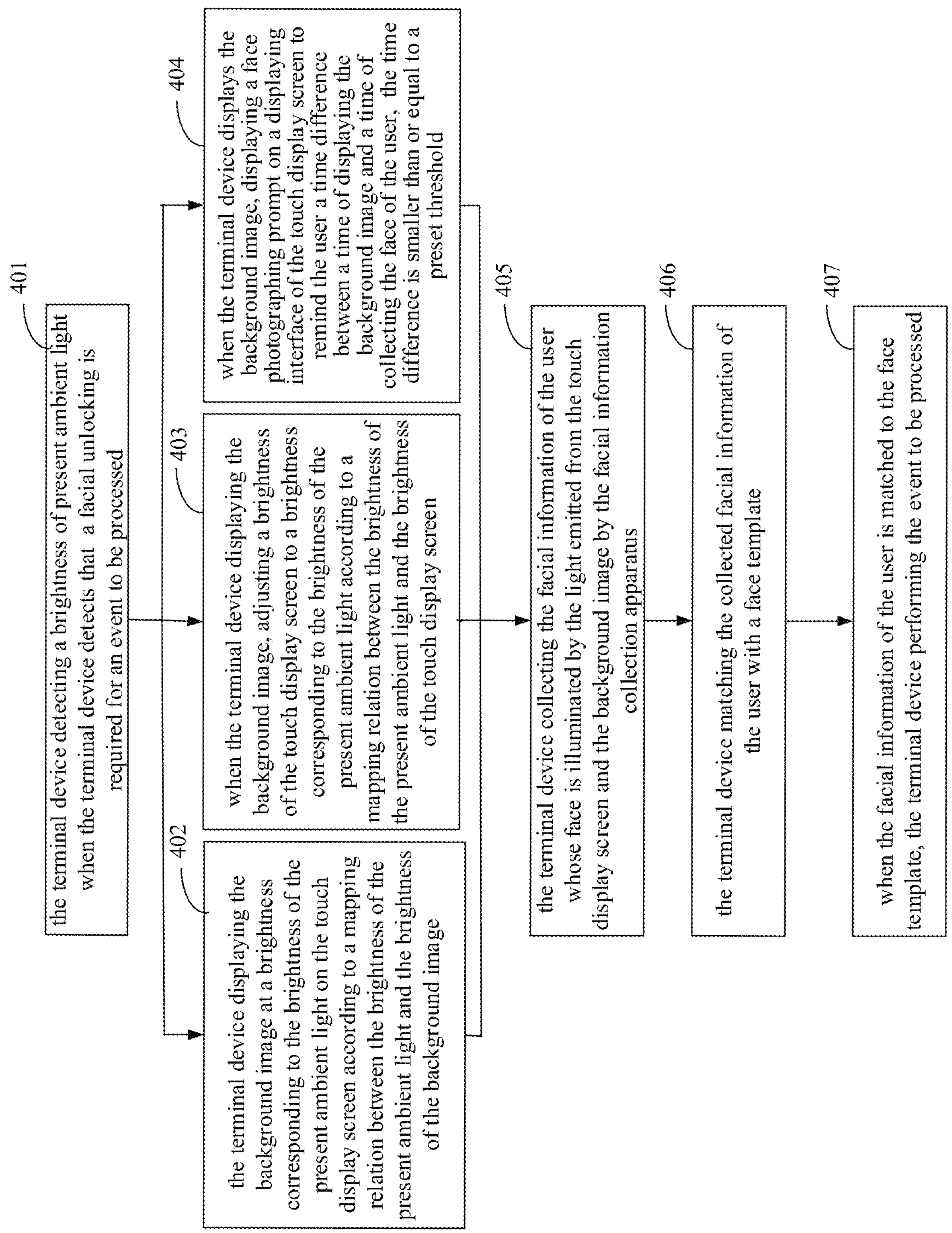
FIG. 4 is a schematic flow chart of a method for collecting facial information provided by another embodiment of the present disclosure.

Embodiments of the present disclosure also provide another method in more detail. Referring to FIG. 4, the method may include followings.

At block 401, the terminal device detects a brightness of present ambient light when the terminal device detects that a facial unlocking is required for an event to be processed.

At block 402, the terminal device displays the background image at a brightness corresponding to the brightness of the present ambient light on the touch display screen according to a mapping relation between the brightness of the present ambient light and the brightness of the background image, in which a brightness of the background image is greater than or equal to a first brightness, and light emitted from the touch display screen and the background image is configured to illuminate a face of a user.

At block 403, when the terminal device displays the background image, a brightness of the touch display screen is adjusted to a brightness corresponding to the brightness of the present ambient light according to a mapping relation between the brightness of the present ambient light and the brightness of the touch display screen.

At block 404, when the terminal device displays the background image, a face photographing prompt is displayed on a displaying interface of the touch display screen to remind the user a time difference between a time of displaying the background image and a time of collecting the face of the user, in which the time difference is smaller than or equal to a preset threshold.

At block 405, the terminal device collects the facial information of the user whose face is illuminated by the light emitted from the touch display screen and the background image by the facial information collection apparatus.

At block 406, the terminal device matches the collected facial information of the user with a face template.

At block 407, when the facial information of the user is matched to the face template, the terminal device performs the event to be processed.

It should be noted that the specific implementation of acts of the method illustrated in FIG. 4 may refers to the specific implementing process of the above described method, which will not be described herein.

The method according to embodiments of the present disclosure is described in detail above. The apparatus according to embodiments of the present disclosure will be provided in followings.

Figure 5:
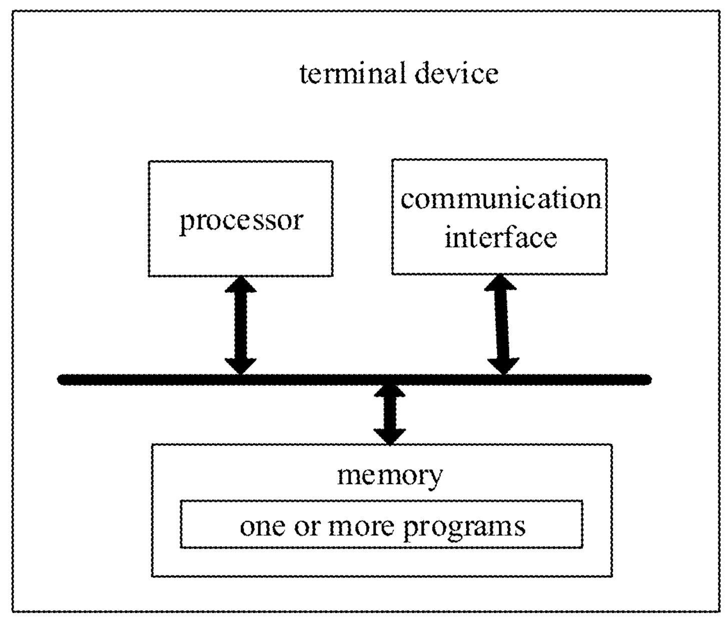
FIG. 5 is a schematic structure diagram of a terminal device provided by an embodiment of the present disclosure.

Referring to FIG. 5, FIG. 5 is a schematic structure diagram of a terminal device 500 provided by an embodiment of the present disclosure. The terminal device 500 may include at least one processor, at least one memory, at least one communication interface and one or more programs.

The one or more programs are stored in the memory and configured to be executed by the processor, the programs may include instructions for performing following acts, including: displaying a background image on the touch display screen, in which a brightness of the background image is greater than or equal to a first brightness, and light emitted from the touch display screen and the background image is configured to illuminate a face of a user; and collecting, by the facial information collection apparatus, the facial information of the user whose face is illuminated by the light emitted from the touch display screen and the background image.

In an example, before the background image is displayed on the touch display screen, the programs may also include instructions for performing an act of: detecting a brightness of present ambient light.

When displaying the background image on the touch display screen, the programs may also include instructions for performing an act of: displaying the background image at a brightness corresponding to the brightness of the present ambient light on the touch display screen according to a mapping relation between the brightness of the present ambient light and the brightness of the background image.

In an example, the programs may also include instructions for performing acts including: when displaying the background image, adjusting a brightness of the touch display screen to a brightness corresponding to the brightness of the present ambient light according to a mapping relation between the brightness of the present ambient light and the brightness of the touch display screen.

In an example, when a sum of the brightness of the background image and the brightness of the present ambient light is greater than or equal to a second brightness, the brightness of the touch display screen is smaller than the brightness of the background image.

In an example, the programs may also include instructions for performing acts of: when displaying the background image, displaying a face photographing prompt on a displaying interface of the touch display screen to remind the user a time difference between a time of displaying the background image and a time of collecting the face of the user, in which the time difference is smaller than or equal to a preset threshold.

It should be noted that the specific implementation of the content described in this embodiment may refers to the above described method, which will not be described herein.

The solution of embodiments of the present disclosure is described above mainly from the perspective of a method performing a process. It can be understood that, in order to implement the above functions, the terminal device includes a corresponding hardware structure and/or software module for executing each function. Those skilled in the art will appreciate that the present disclosure may be implemented in a manner of hardware or a combination of hardware and computer software in combination with units and algorithm steps of the various examples described in the embodiments disclosed herein. Whether a function is implemented in hardware or computer software driving hardware depends on the specific application and design constraints of the solution. Those skilled in the art can use different methods for implementing the described functions for each particular application, but such implementation should not be considered to be beyond the scope of the present disclosure.

The terminal device may be divided into functional units according to the above method in embodiments of the present disclosure. For example, each functional unit may be divided to correspond to each function, or two or more functions may be integrated into one processing unit. The above integrated unit may be implemented in the form of hardware or in the form of a software functional unit. It should be noted that the division of the unit in embodiments of the present disclosure is schematic, which is merely a logical function division, and other division manners may be allowed in the actual implementation.

Figure 6:
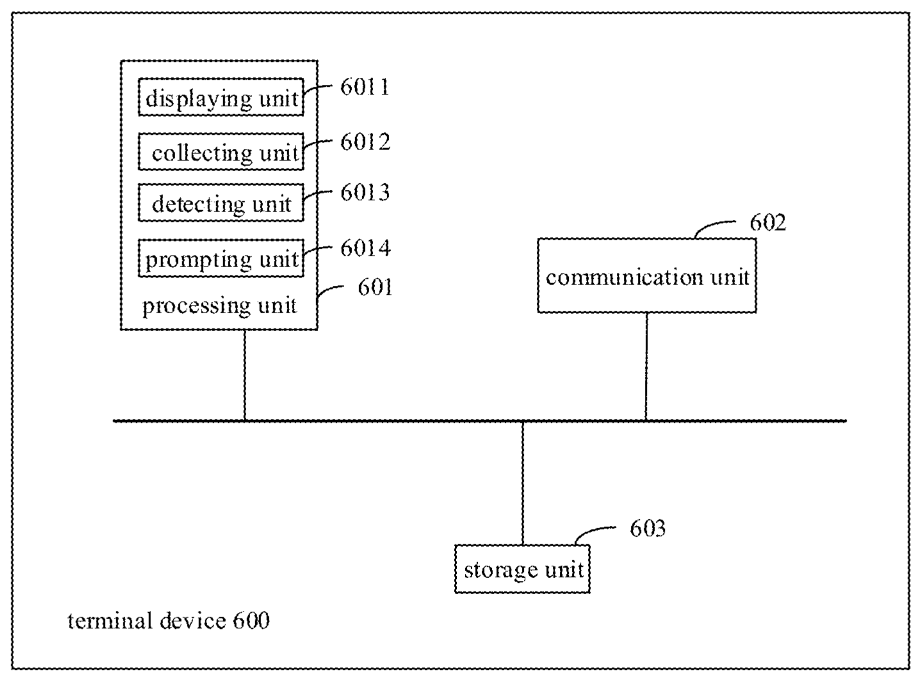
FIG. 6 is a schematic structure diagram of a terminal device provided by another embodiment of the present disclosure.

In a case of employing an integrated unit, FIG. 6 illustrates a block diagram of a possible functional unit configuration of the terminal device involved in the above embodiment. The terminal device 600 includes a processing unit 601, a communication unit 602, and a storage unit 603. The processing unit 601 includes a displaying unit 6011, a collecting unit 6012, a detecting unit 6013, and a prompting unit 6014. The storage unit 603 is configured to store program codes and data of the terminal device. The communication unit 602 is configured to support a communication between the terminal device and other devices. Some of the above units (the displaying unit 6011, the collecting unit 6012, the detecting unit 6013, and the prompting unit 6014) are configured to perform the relevant acts of the above method.

The displaying unit 6011 is configured to display a background image on a touch display screen, in which a brightness of the background image is greater than or equal to a first brightness, and light emitted from the touch display screen and the background image is configured to illuminate a face of a user.

The collecting unit 6012 is configured to collect the facial information of the user whose face is illuminated by the light emitted from the touch display screen and the background image.

In an example, before the displaying unit 6011 displays the background image on the touch display screen, the terminal device may also include the detecting unit 6013 configured to detect a brightness of present ambient light.

The displaying unit 6011 displays the background image on the touch display screen by performing acts of: displaying the background image at a brightness corresponding to the brightness of the present ambient light on the touch display screen according to a mapping relation between the brightness of the present ambient light and the brightness of the background image.

In an example, the displaying unit 6011 is also configured to adjust, when displaying the background image, a brightness of the touch display screen to a brightness corresponding to the brightness of the present ambient light according to a mapping relation between the brightness of the present ambient light and the brightness of the touch display screen.

In an example, when a sum of the brightness of the background image and the brightness of the present ambient light is greater than or equal to a second brightness, the brightness of the touch display screen is smaller than the brightness of the background image.

In an example, the terminal device may also include the prompting unit 6014. The prompting unit 6014 is configured to display, when the displaying unit 6011 displays the background image, a face photographing prompt on a displaying interface of the touch display screen to remind the user a time difference between a time of displaying the background image and a time of collecting the face of the user, in which the time difference is smaller than or equal to a preset threshold.

The processing unit 601 may be a processor or a controller (such as a central processing unit (CPU), a general purpose processor, a digital signal processor (DSP), and an application specific integrated circuit (ASIC), a field programmable gate array (FPGA)) or other programmable logic devices, transistor logic devices, hardware components, or any combination thereof, which may implement or perform exemplary logical blocks, modules and circuits in connection with the present disclosure. The processor may also be a combination such as a combination of one or more microprocessors or a combination of DSPs and microprocessors and the like, so as to compute functions. The storage unit 603 may be a memory, and the communication unit 602 may be a transceiver, a transceiver circuit, a radio frequency chip, a communication interface and the like.

Figure 7:
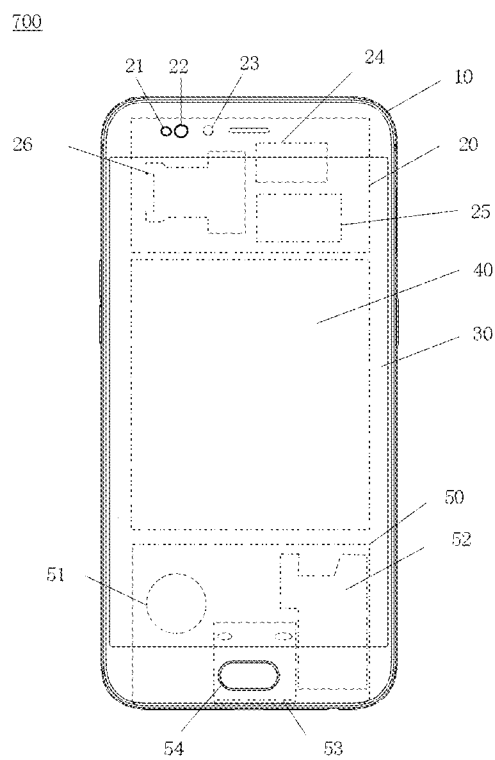
FIG. 7 is a schematic structure diagram of a terminal device provided by another embodiment of the present disclosure.

Embodiment of the present disclosure also provides a terminal device, as shown in FIG. 7. For the convenience of description, only the parts related to the embodiments of the present disclosure are illustrated. The specific technical details which are not disclosed may refer to the method part of embodiments of the present disclosure.

Referring to FIG. 7, FIG. 7 is a schematic structure diagram of a terminal device 700 provided by an embodiment of the present disclosure. The terminal device 700 may include a housing 10, a main board 20, a touch display screen 30, a battery 40, and a sub-board 50. The main board 20 is provided with an infrared light source 21, an iris camera 22, a front camera 23, a processor 24, a memory 25, an SIM card slot 26 and the like. The sub-board is provided with a vibrator 51, an integrated sound chamber 52, a VOOC flash charging interface 53 and a fingerprint module 54. The front camera 23 constitutes a facial information collection apparatus of the terminal device 700.

The processor 24 is configured to control a background image to be displayed on a touch display screen, in which a brightness of the background image is greater than or equal to a first brightness, and light emitted from the touch display screen and the background image is configured to illuminate a face of a user.

The apparatus 23 for collecting the facial information is configured to collect the facial information of the user whose face is illuminated by the light emitted from the touch display screen and the background image.

In an example, the processor 24 may be also configured to acquire a brightness of present ambient light.

The processor 24 controls the background image to be displayed on the touch display screen 30 by performing an act of: displaying the background image at a brightness corresponding to the brightness of the present ambient light on the touch display screen according to a mapping relation between the brightness of the present ambient light and the brightness of the background image.

In an example, when the processor 24 controls the background image to be displayed on the touch display screen, the processor 24 is also configured to adjust a brightness of the touch display screen to a brightness corresponding to the brightness of the present ambient light according to a mapping relation between the brightness of the present ambient light and the brightness of the touch display screen.

In an example, when a sum of the brightness of the background image and the brightness of the present ambient light is greater than or equal to a second brightness, the brightness of the touch display screen is smaller than the brightness of the background image.

In an example, when the processor 24 controls the background image to be displayed on the touch display screen, the processor 24 is configured to display a face photographing prompt on a displaying interface of the touch display screen to remind the user a time difference between a time of displaying the background image and a time of collecting the face of the user, in which the time difference is smaller than or equal to a preset threshold.

Embodiments of the present disclosure also provide a computer storage medium. The computer storage medium is configured to store computer programs for exchanging digital data, in which the computer programs are executed to cause a computer performing all or a part of acts in any method described above.

Embodiments of the present disclosure also provide a computer program product. The computer program product may include a non-transitory computer readable storage medium storing computer programs, the computer programs are operated to cause a computer to perform all or a part of acts in any method described above. The computer program product may be a software installation package, and the computer includes a terminal device.

It should be noted that, for convenience and simplicity of description, the above method embodiments are described in a form of a combination of a series of steps. However, those skilled in the art can understand clearly that, the present disclosure is not limited by the order of the steps, since some steps according to present disclosure may be performed simultaneously or in other orders. In addition, those skilled in the art can understand clearly that, the described embodiments are preferred embodiments, of which relative steps or modules may be unnecessary for the present disclosure.

In above embodiments, each embodiment may be described focusing on different aspects. Parts not be described in some embodiments may refer to relative descriptions in other embodiments.

In embodiments provided by the present disclosure, it should be understood that, the disclosed apparatus may be realized in any other manner. For example, the apparatus embodiments described above can be merely exemplary, for example, the units are just divided according to logic functions, for example, the division of the units is merely a logical functional division and there may be other dividing manners. For example, multiple units or components can be combined or integrated into another system, or some features can be omitted or not executed. In addition, the mutual coupling or direct coupling or communication connection described or discussed can be via some interfaces, and indirect coupling or communication connection between devices or units may be electrical, mechanical or of other forms.

The units illustrated as separate components can be or not be separated physically, and components described as units can be or not be physical units, i.e., can be located at one place, or can be distributed onto multiple network units. It is possible to select some or all of the units according to actual needs, for realizing the objective of embodiments of the present disclosure.

In addition, respective functional units in respective embodiments of the present disclosure can be integrated into one processing unit, or can be present as separate physical entities. It is also possible that two or more than two units are integrated into one unit. The above integrated unit may be realized in a manner of hardware or a software functional unit.

If the functions are realized in form of functional software units and are sold or used as separate products, they can be stored in a computer readable storage medium. Based on this understanding, the parts of the technical solutions or the essential parts of the technical solutions (i.e. the parts making a contribution to the related art) can be embodied in form of software product, which is stored in a storage medium, and includes several instruction used for causing a computer device (for example, a personal computer, a server or a network device) to execute all or part of steps in the methods described in respective embodiments of the present disclosure. The above storage medium may be any medium capable of storing program codes, including a USB flash disk, a mobile hard disk, a Read-Only Memory (ROM), a Random Access Memory (RAM), a disc, or a light disk.

It should be understood that all or a part of the method provided by the present disclosure may be realized by programs instructing relative hardware, the programs may be stored in a computer-readable memory. The memory may include a flash disk, an ROM, an RAM, a magnet disk, a light disk and the like.

The forgoing description is only directed to preferred embodiments of the present disclosure, but not used to limit the present disclosure. All modifications, equivalents, variants and improvements made within the spirit and principle of the present disclosure shall fall within the protection scope of the present disclosure. Thus, the protection scope of the present disclosure shall be limited by the protection scope of the claims.

What is claimed is:

1. A method for collecting facial information, applicable to a terminal device comprising a facial information collection apparatus and a touch display screen, comprising:

displaying a background image on the touch display screen, wherein a brightness of the background image is greater than or equal to a first brightness, and light emitted from the touch display screen and the background image is configured to illuminate a face of a user; and collecting, by the facial information collection apparatus, the facial information of the user with the face illuminated by the light emitted from the touch display screen and the background image;

wherein when a sum of the brightness of the background image and the brightness of the present ambient light is greater than or equal to a second brightness, the method further comprises:

enabling the brightness of the touch display screen to be smaller than the brightness of the background image, and the second brightness is a minimum value of the sum of the brightness of the background image and the brightness of the present ambient light as an auxiliary light source to illuminate the face of the user when the terminal device collects the facial information in a dark visual environment.

2. The method according to claim 1, wherein the method further comprises:

detecting a brightness of present ambient light; and displaying the background image on the touch display screen comprises:

displaying the background image at a brightness corresponding to the brightness of the present ambient light on the touch display screen according to a mapping relation between the brightness of the present ambient light and the brightness of the background image.

3. The method according to claim 2, wherein detecting the brightness of the present ambient light comprises:

detecting the brightness of present ambient light within a predetermined space range by an ambient light sensor of the terminal device.

4. The method according to claim 2, wherein when there are a plurality of background images corresponding to the brightness of the present ambient light, displaying the background image at a brightness corresponding to the brightness of the present ambient light on the touch display screen comprises:

selecting a background image from the plurality of background images according to a preset rule; and displaying the selected background image on the touch display screen.

5. The method according to claim 4, wherein the preset rule comprises at least one of:

selecting the background image randomly from the plurality of background images;

selecting the background image from the plurality of background images based on a color of the background image and a predetermined color sequence;

selecting the background image with maximum brightness from the plurality of background images; and acquiring a browsing history record of the user within a preset time period, determining preference of the user according to the browsing history record, and selecting the background image associated with the preference from the plurality of background images.

6. The method according to claim 2, further comprising:

when displaying the background image, adjusting a brightness of the touch display screen to a brightness corresponding to the brightness of the present ambient light according to a mapping relation between the brightness of the present ambient light and the brightness of the touch display screen.

7. The method according to claim 2, further comprising: when displaying the background image, adjusting a brightness of the touch display screen to a fixed brightness.

8. The method according to claim 1, wherein enabling the brightness of the touch display screen to be smaller than the brightness of the background image comprises:

adjusting the brightness of the touch display screen to minimum.

9. The method according to claim 1, further comprising: when displaying the background image, displaying a face photographing prompt on a displaying interface of the touch display screen to remind the user a time difference between a time of displaying the background image and a time of collecting the face of the user, wherein the time difference is smaller than or equal to a preset threshold.

10. The method according to claim 9, wherein displaying the face photographing prompt on the displaying interface of the touch display screen comprises:

popping out a face photographing prompt box on the displaying interface of the touch display screen; and displaying the face photographing prompt in the face photographing prompt box, wherein the face photographing prompt comprises at least one of a text prompt, a digital prompt, an animation prompt and a voice prompt.

11. The method according to claim 1, further comprising:

matching the facial information of the user collected by the facial information collection apparatus with a face template;

performing an event to be processed when the facial information of the user is matched with the face template.

12. The method according to claim 11, wherein when the event to be processed is a screen unlocking event and the terminal device is in a black screen state, the method further comprises:

illuminating the touch display screen of the terminal device before displaying the background image on the touch display screen.

13. The method according to claim 1, wherein the background image displayed on the touch display screen is an image of a plurality of background images stored in a background image gallery in the terminal device, and the method further comprises:

updating the plurality of background images in the background image gallery periodically, in which at least one background image in the updated background image gallery is different from the plurality of background images in the background image gallery before updating.

14. The method according to 13, wherein updating the plurality of background images in the background image gallery periodically comprises:

acquiring a behavior record of the user within a period of time;

determining K topics that the user is interested in according to the behavior record;

acquiring W images belonging to one of the K topics from images stored in the terminal device, in which the brightness of each of the W images is greater than or equal to the first brightness; and replacing W background images in the background image gallery with the W images, where K and W are positive integers.

15. The method according to 13, wherein updating the plurality of background images in the background image gallery periodically comprises:

acquiring M images added in the terminal device within a period of time;

acquiring J images each with brightness greater than or equal to the first brightness from the M images; and replacing J background images in the background image gallery with the J images, where J is less than or equal to M, and M is an integer greater than 1.

16. A terminal device, comprising a front camera, a touch display screen and a processor, wherein, the processor is configured to control a background image to be displayed on the touch display screen, in which a brightness of the background image is greater than or equal to a first brightness, and light emitted from the touch display screen and the background image is configured to illuminate a face of a user; and the front camera is configured to collect the facial information of the user with the face illuminated by the light emitted from the touch display screen and the background image;

wherein when a sum of the brightness of the background image and the brightness of the present ambient light is greater than or equal to a second brightness, the brightness of the touch display screen is smaller than the brightness of the background image, and the second brightness is a minimum value of the sum of the brightness of the background image and the brightness of the present ambient light as an auxiliary light source to illuminate the face of the user when the terminal device collects the facial information in a dark visual environment.

17. The terminal device according to claim 16, wherein, the processor is configured to acquire a brightness of present ambient light;

the processor is configured to control the background image to be displayed on the touch display screen by an operation of:

controlling the background image at a brightness corresponding to the brightness of the present ambient light to be displayed on the touch display screen according to a mapping relation between the brightness of the present ambient light and the brightness of the background image.

18. The terminal device according to claim 17, wherein, when the processor controls the background image to be displayed on the touch display screen, the processor is further configured to:

control a brightness of the touch display screen to be adjusted to a brightness corresponding to the brightness of the present ambient light according to a mapping relation between the brightness of the present ambient light and the brightness of the touch display screen.

19. A non-transitory computer readable storage medium for storing computer programs for exchanging digital data, wherein the computer programs are executed to cause a computer performing a method for collecting facial information, comprising:

displaying a background image on the touch display screen, wherein a brightness of the background image is greater than or equal to a first brightness, and light emitted from the touch display screen and the background image is configured to illuminate a face of a user; and collecting, by the facial information collection apparatus, the facial information of the user whose face is illuminated by the light emitted from the touch display screen and the background image;

wherein when a sum of the brightness of the background image and the brightness of the present ambient light is greater than or equal to a second brightness, the method further comprises:

enabling the brightness of the touch display screen to be smaller than the brightness of the background image, and the second brightness is a minimum value of the sum of the brightness of the background image and the brightness of the present ambient light as an auxiliary light source to illuminate the face of the user when the terminal device collects the facial information in a dark visual environment.

* * * * *